(12) United States Patent
Hamanaka

(10) Patent No.: US 6,931,442 B1
(45) Date of Patent: Aug. 16, 2005

(54) NETWORKED DEVICES, ADAPTERS AND METHODS WHICH IDENTIFY MONITORED EQUIPMENT UNITS

(75) Inventor: Makoto Hamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/357,926

(22) Filed: Jul. 21, 1999

(30) Foreign Application Priority Data

Sep. 14, 1998 (JP) .......................................... 10-260094

(51) Int. Cl.⁷ ........................................... G06F 15/173
(52) U.S. Cl. ...................... 709/224; 709/202; 709/217; 709/223; 713/201; 345/734; 345/736
(58) Field of Search ................................. 709/200–203, 709/217–218, 223–224, 245, 250; 713/201–202; 345/733–736

(56) References Cited

U.S. PATENT DOCUMENTS

| | | | | |
|---|---|---|---|---|
| 5,557,730 A | * | 9/1996 | Frid-Nielsen | 709/218 |
| 6,041,349 A | * | 3/2000 | Sugauchi et al. | 709/224 |
| 6,115,776 A | * | 9/2000 | Reid et al. | 709/250 |
| 6,298,374 B1 | * | 10/2001 | Sasaki et al. | 709/223 |
| 6,332,159 B1 | * | 12/2001 | Hatae et al. | 709/224 |
| 6,369,820 B1 | * | 4/2002 | Bertram et al. | 709/224 |
| 6,381,700 B1 | * | 4/2002 | Yoshida | 713/201 |
| 6,470,385 B1 | * | 10/2002 | Nakashima et al. | 709/224 |
| 6,484,261 B1 | * | 11/2002 | Wiegel | 713/201 |

* cited by examiner

Primary Examiner—Bharat Barot
(74) Attorney, Agent, or Firm—Staas & Halsey LLP

(57) ABSTRACT

Each of a plurality of monitored equipment units has an ID information sending unit for sending to a monitoring equipment ID information to identify one's own self through a predetermined operation for oneself. The monitoring equipment comprises an ID information receiving unit for receiving ID information transmitted, a display screen, and a symbol list display for displaying on the display screen a list of symbols each corresponding to an associated one of the plurality of monitored equipment units. The symbol list display displays, upon receipt of the ID information by the ID information receiving unit, a symbol associated with a monitored equipment unit identified by the received ID information, in the list of symbols displayed on the display screen, in a display format different from a display format for other symbols.

16 Claims, 13 Drawing Sheets

NETWORKED DEVICES, ADAPTERS AND METHODS WHICH IDENTIFY MONITORED EQUIPMENT UNITS

BACKGROUND OF THE INVENTION

1. Field of the Invention

The present invention relates to a network system comprising a monitoring equipment and a plurality of monitored equipment units which are connected with one another through a network, a monitoring equipment which is connected with a plurality of monitored equipment units through a network, a monitored equipment unit which is connected with a monitoring equipment through a network, and an adapter disposed between a network to which a monitoring equipment is connected and a monitored equipment unit in association with the monitored equipment unit, the adapter mediating a communication through the network.

2. Description of the Prior Art

Recently, there is a tendency that various types of peripheral equipment are connected to a network. As one of technologies of identifying as to what type of peripheral equipment is connected to a network, there is known a technology wherein in accordance with a software, there is displayed on a display screen a list of symbols associated with types of peripheral equipment connected to the network, each of the symbols consisting of characters, icons, etc., which corresponds to the associated type of peripheral equipment. However, according to this technology, in the event that the same type of plurality of peripheral equipment units are connected to a single network, it often happens that a plurality of same symbols corresponding to the same type of plurality of peripheral equipment units are displayed on the display screen. Consequently, even if a user intends to designate one of the same type of plurality of peripheral equipment units to access the designated one, it is difficult for the user to identify the symbol of interest to the plurality of same symbols. In this case, in order that the user identifies the association of the symbols with the peripheral equipment units, there are considered some methods, for example, such a way that the user arbitrarily selects one from among the plurality of same symbols and actually performs a trial access to the peripheral equipment associated with the selected symbol, or alternatively a method in which an ID or the name is applied to the peripheral equipment for the purpose of discrimination.

However, of the peripheral equipment, there may be such a type of peripheral equipment having only a function of simply transmitting information to a computer or another peripheral equipment, but having no function of performing any operation upon receipt of information from a computer or the like. Further, there may be such a type of peripheral equipment which needs a high level of knowledge for operating the same. Accordingly, the above-mentioned way of actually performing a trial access is not suitable for the purpose of readily identifying the association between the symbol and the peripheral equipment.

Further, with respect to the method in which an ID or the name is applied to the peripheral equipment for the purpose of discrimination, this method encounters such a troublesomeness that a user applies an ID or the name to each peripheral equipment, and registers those with a computer, and further has to remember the Ids or the names thus registered. Thus, this method is of no practical use.

Thus, in the event that the same type of plurality of peripheral equipment units are connected to a single network, and a plurality of same symbols, such as icons of the same or similar design, corresponding to the same type of plurality of peripheral equipment units are displayed on the display screen, it is a problem how a desired one of the plurality of peripheral equipment units is simply and readily specified.

In accordance with a recent development of a home network and a business network, it is expected that an opportunity that many same type of peripheral equipment units are connected to a single network will be increased in near future. And thus, it is expected that the above-mentioned problem will be a more serious problem.

SUMMARY OF THE INVENTION

In view of the foregoing, it is an object of the present invention to provide a network system comprising a monitoring equipment and a plurality of monitored equipment units which are connected with one another through a network, wherein even if the plurality of monitored equipment units are of the same type, a desired monitored equipment unit can be readily specified at the monitoring equipment end, a monitoring equipment and a monitored equipment unit, which are suitable for such a network system, and an adapter disposed between a network to which a monitoring equipment is connected and a monitored equipment unit in association with the monitored equipment unit, so that the monitored equipment unit can be readily specified at the monitoring equipment end.

To achieve the above-mentioned object, the present invention provides a first network system in which a monitoring equipment and a plurality of monitored equipment units are interconnected through a network, wherein each of said plurality of monitored equipment units has ID information sending means for sending to said monitoring equipment ID information to identify one's own self through a predetermined operation for oneself, said monitoring equipment comprises ID information receiving means for receiving ID information transmitted, a display screen, and symbol list display means for displaying on said display screen a list of symbols each corresponding to an associated one of said plurality of monitored equipment units, and said symbol list display means displays, upon receipt of the ID information by said ID information receiving means, a symbol associated with a monitored equipment unit identified by the received ID information, in the list of symbols displayed on said display screen, in a display format different from a display format for other symbols.

Here, the above-referenced "symbols" are not restricted to a specific display format. Any of characters, figures and the like is available for the "symbols", and it is acceptable to use one affecting as an icon.

Also, with respect to the "display format different from a display format for other symbols", it is not restricted to a specific display format. It is possible to adopt various different display formats, for example, a black-and-white reversing display, a symbol flashing display, an alteration of a symbol size, an alteration of a design, etc.

According to the first network system of the present invention, a monitored equipment unit sends to the monitoring equipment ID information to identify one's own self through a predetermined operation for oneself, the monitoring equipment receives the ID information, and symbol list display means displays, upon receipt of the ID information, a symbol associated with a monitored equipment unit identified by the received ID information, in the list of symbols displayed on said display screen, in a display format different from a display format for other symbols. This feature makes it possible, when it is intended to know the association between a symbol and a monitored equipment unit of interest, to readily find the symbol associated with the monitored equipment unit of interest by a verification on the display screen through a specific operation for the monitored equipment unit of interest.

In the first network system of the present invention, it is acceptable that an adapter for mediating a communication through the network is provided for a monitored equipment unit in association with part or whole of said plurality of monitored equipment units, and as to the monitored equipment unit having the adapter of said plurality of monitored equipment units, instead of that the monitored equipment unit having the adapter is provided with said ID information sending means, the adapter comprises a handler and ID information sending means for sending to said monitoring equipment ID information to identify the monitored equipment unit having the adapter through an operation of said handler.

A provision of such an adapter makes it possible, even for a monitored equipment unit having no function of sending ID information to the monitoring equipment, to readily identify the symbol associated with the monitored equipment unit at the monitoring equipment end, by sending the ID information to monitoring equipment by the adapter instead of the monitored equipment unit.

Further, in the first network system of the present invention, it is acceptable that in the event that said ID information receiving means receives a plurality of pieces of ID information, said symbol list display means displays a plurality of symbols associated with a plurality of monitored equipment units identified by the plurality of pieces of ID information received in a display format different from a display format for symbols other than said plurality of symbols.

In the event that the monitoring equipment receives a plurality of pieces of ID information, while it is acceptable that only a symbol associated with ID information finally received, of the list of symbols displayed on the display screen of the monitoring equipment is displayed on a different display format, it is acceptable that a plurality of symbols associated with a plurality of pieces of ID information received are simultaneously displayed on a different display format indicating that ID information is received. In this manner, a plurality of symbols are simultaneously displayed on a different display format indicating that ID information is received. This feature is effective in the event that there is no need to individually distinguish a plurality of monitored equipment units which are identified, for example, a plurality of air-conditioners.

In the first network system as mentioned above, it is acceptable that said monitoring equipment further comprises:
 a selection information recording unit for recording selection information representing as to whether said plurality of monitored equipment units are in a state that they are selected; and
 a recording unit responsive to reception of the ID information by said ID information receiving means for causing said selection information recording unit to record selection information representative of a matter that monitored equipment units identified by the received ID information are selected.

In the first network system of the present invention, basically, it is sufficient that a display format for symbols displayed on a display screen is altered, and it is acceptable that after an identification of a symbol, an operation for selection of the monitored equipment unit associated with the symbol is performed independently of the identification of the symbol. On the other hand, it is also acceptable that an operation for an identification of a symbol associated with a monitored equipment unit of interest serves as an selection operation of the monitored equipment unit of interest. This feature may avoid, in the event that a control of a monitored equipment unit of interest is performed subsequent to an identification of the monitored equipment unit, such a necessity that the operation for selection of the monitored equipment unit is individually performed, and thereby saving a trouble for operations.

In the first network system as mentioned above, it is acceptable that in the event that said ID information receiving means receives a plurality of pieces of ID information, said recording unit causes said selection information recording unit to record selection information representative of a matter that a plurality of monitored equipment units identified by the received plurality of pieces of ID information are selected.

This feature is effective in the event that the same control for a plurality of monitored equipment units is simultaneously performed, and may avoid an operation on the monitor equipment for a selection of the monitored equipment unit intended to be controlled.

A monitoring equipment of the present invention is suitable for the first network system as mentioned above. That is, according to the present invention, there is provided a monitoring equipment connected to a plurality of monitored equipment units through a network, wherein
 said monitoring equipment comprises ID information receiving means for receiving ID information to identifying monitored equipment units, a display screen, and symbol list display means for displaying on said display screen a list of symbols each corresponding to an associated one of said plurality of monitored equipment units connected to the network, and
 in the event that said ID information receiving means receives the ID information, said symbol list display means displays a symbol associated with a monitored equipment unit identified by the received ID information, in the list of symbols displayed on said display screen, in a display format different from a display format for other symbols.

In the monitoring equipment as mentioned above, it is acceptable that in the event that said ID information receiving means receives a plurality of pieces of ID information, said symbol list display means displays a plurality of symbols associated with a plurality of monitored equipment units identified by the plurality of pieces of ID information received in a display format different from a display format for symbols other than said plurality of symbols.

In the monitoring equipment as mentioned above, it is preferable that said monitoring equipment comprises:
 a selection information recording unit for recording selection information representing as to whether said plurality of monitored equipment units are in a state that they are selected; and
 a recording unit responsive to reception of the ID information by said ID information receiving means for causing said selection information recording unit to record selection information representative of a matter that monitored equipment units identified by the received ID information are selected.

Further, in this monitoring equipment, it is acceptable that in the event that said ID information receiving means receives a plurality of pieces of ID information, said recording unit causes said selection information recording unit to record selection information representative of a matter that a plurality of monitored equipment units identified by the received plurality of pieces of ID information are selected.

A first adapter of the present invention is suitable for the first network system as mentioned above. That is, according to the present invention, there is provided a first adapter for mediating a communication through a network to which a monitoring equipment is connected, said adapter being disposed between the network and a monitored equipment unit in association with the monitored equipment unit, wherein said adapter comprises:

a handler; and

ID information sending means for sending to said monitoring equipment ID information to identify the monitored equipment unit having the adapter through an operation of said handler.

To achieve the above-mentioned object, the present invention provides a second network system in which a monitoring equipment and a plurality of monitored equipment units are interconnected through a network, wherein said monitoring equipment comprises a display screen, symbol list display means for displaying on said display screen a list of symbols each corresponding to an associated one of said plurality of monitored equipment units, a handler for designating a desired symbol from among the list of symbols displayed on said display screen, and designation information sending means for sending to a monitored equipment unit associated with a symbol designated in accordance with an operation of said handler designation information indicating that the monitored equipment unit is designated, and each of said plurality of monitored equipment units comprises designation information receiving means for receiving designation information indicating that oneself is designated, and response means responsive to the designation information by said designation information receiving means for making a performance indicating that oneself is a monitored equipment unit designated by the designation information.

Here, the above-referenced "performance" is not restricted to the specific performance. For example, it is acceptable that a light source, which turns on when oneself is designated, or a buzzer, which generates sound when oneself is designated, is provided to indicate with the turning on of the light source or the sound generated by the buzzer that oneself is the designated monitored equipment unit. Alternatively, in the event that there is provided no dedicated equipment (e.g. the above-mentioned light source and buzzer) for indicating that oneself is designated, and there is provided a performance mode with which the monitored equipment unit is originally provided, but it is not usually used, the performance mode having no effect on another, it is acceptable that such a performance mode is utilized to indicate that oneself is designated.

According to the second network system of the present invention, when a handler is operated at the monitoring equipment end to designate a specific symbol, a monitored equipment unit associated with the designated symbol makes a performance to indicate that oneself is designated. Thus, when a user is intended to know the association between symbols and monitored equipment units, the user first operates a handler at the monitoring equipment end to designate a desired symbol of the list of symbols. Then, in response to the designation, any one of the monitored equipment units makes a performance to indicate that oneself is designated. Thus, the user verifies the performance. Such a performance makes it possible for the user to readily find a monitored equipment unit associated with the symbol.

In the second network system as mentioned above, it is acceptable that an adapter for mediating a communication through the network is provided for a monitored equipment unit in association with part or whole of said plurality of monitored equipment units, and as to the monitored equipment unit having the adapter of said plurality of monitored equipment units, instead of that the monitored equipment unit having the adapter is provided with said designation information receiving means and said response means, the adapter comprises designation information receiving means for receiving designation information indicating that a monitored equipment unit on which oneself is disposed is designated, and response means responsive to the designation information by said designation information receiving means for making a performance indicating that oneself is an adapter disposed on a monitored equipment unit designated by the designation information.

A monitored equipment unit of the present invention is suitable for the above-mentioned second network system. That is, the present invention is to provide a monitored equipment unit connected to a monitoring equipment through a network, wherein said monitored equipment unit comprises designation information receiving means for receiving designation information indicating that oneself is designated, and response means responsive to the designation information by said designation information receiving means for making a performance indicating that oneself is a monitored equipment unit designated by the designation information.

A second adapter of the present invention is suitable for the above-mentioned second network system. That is, the present invention is to provide a second adapter for mediating a communication through a network to which a monitoring equipment is connected, said adapter being disposed between the network and a monitored equipment unit in association with the monitored equipment unit, wherein said adapter comprises:

designation information receiving means for receiving designation information indicating that a monitored equipment unit on which oneself is disposed is designated; and response means responsive to the designation information by said designation information receiving means for making a performance indicating that oneself is an adapter disposed on a monitored equipment unit designated by the designation information.

Further, according to the present invention, there is provided a monitoring program storage medium storing a monitoring program incorporated into a computer having a display screen, said computer being connected to a plurality of monitored equipment units through a network, and said computer serving as a monitoring equipment for monitoring the plurality of monitored equipment units in accordance with said monitoring program, wherein said monitoring program comprises:

ID information receiving means for receiving ID information transmitted via the network to identify the monitored equipment units; and symbol list display means for displaying on said display screen a list of symbols each corresponding to an associated one of said plurality of monitored equipment units connected to the network, and wherein said monitoring program provides such a control that in the event that said ID information receiving means receives the ID information, said symbol list display means displays a symbol associated with a monitored equipment unit identified by the received ID information, in the list of symbols displayed on said display screen, in a display format different from a display format for other symbols.

BRIEF DESCRIPTION OF THE DRAWINGS

FIG. 1) and an adapter connected to the keyboard.

FIG. 1) and an adapter connected to the keyboard.

DETAILED DESCRIPTION OF PREFERRED EMBODIMENTS

Embodiments of the present invention will be described with reference to the accompanying drawings.

Figure 1:
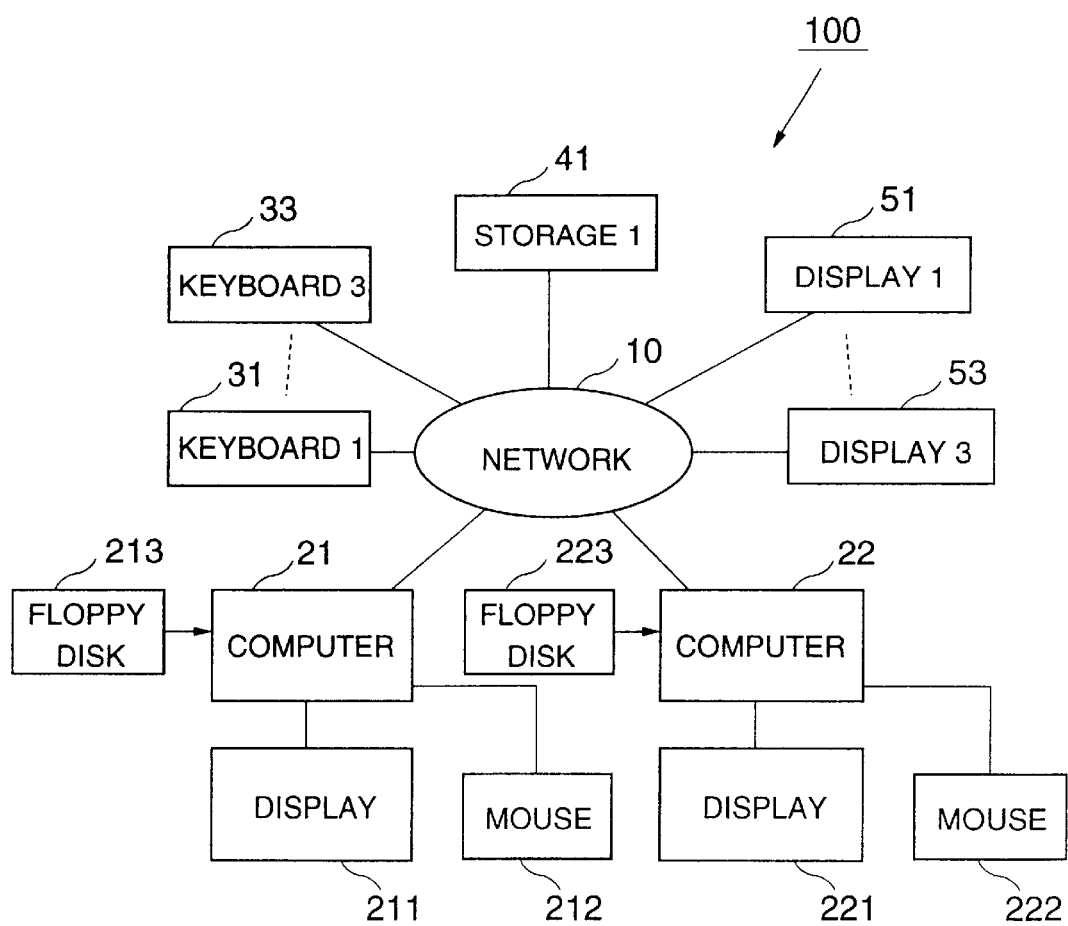
FIG. 1 is a typical illustration of a network system according to a first embodiment of the present invention.

FIG. 1 is a typical illustration of a network system according to a first embodiment of the present invention.

A network system 100 shown in FIG. 1 comprises a network 10, two computers 21 and 22 connected to the network 10, three keyboards 31, ..., 33, a storage 41, and three displays 51, ..., 53. The two computers 21 and 22 are provided with displays 211 and 221 and mice 212 and 222, respectively.

Floppy disks 213 and 223 store monitoring programs referred to in the present invention, which cause the computers 21 and 22 to serve as monitoring equipment units, respectively. The monitoring programs stored in the floppy disks 213 and 223 are up loaded onto the computers 21 and 22, respectively. Devices other than the computers 21 and 22, that is, the keyboards 31, ..., 33, the storage 41, and the displays 51, ..., 53, are monitored equipment units referred to in the present invention. Here, these monitored equipment units are referred to as peripheral equipment units. On display screens (not illustrated in FIG. 1) of the displays 211 and 221 of the computers 21 and 22, there are displayed icon lists each consisting of icons corresponding to the associated monitored equipment units, respectively. Thus, it is possible for an operator to designate a desired icon through the mice 212 and 222.

Figure 2:
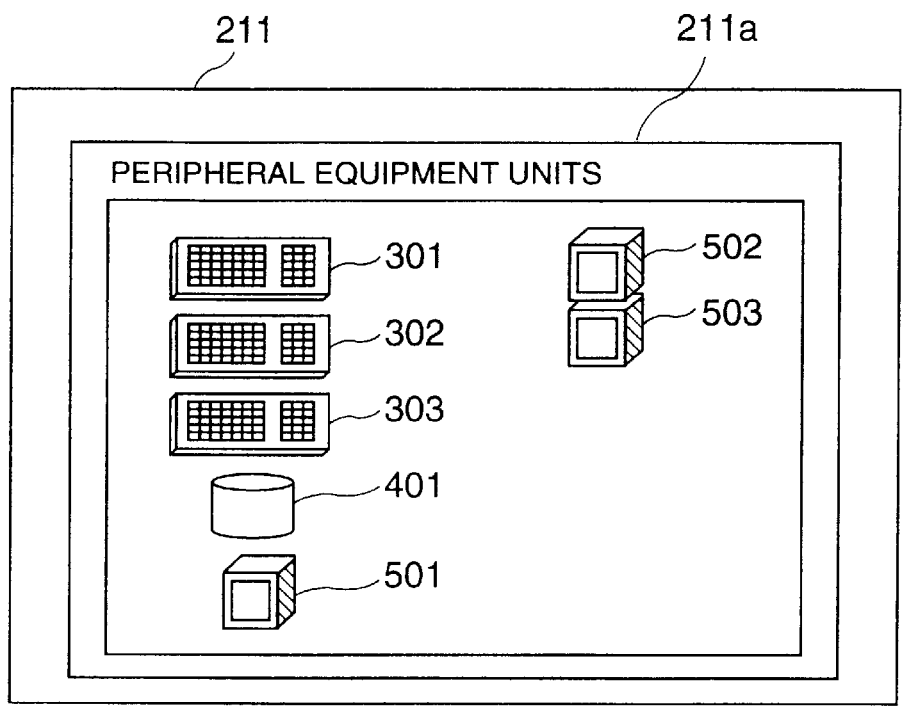
FIG. 2 is an illustration of an example of an icon list displayed on a display screen of a display unit provided on a computer.

FIG. 2 is an illustration of an example of an icon list displayed on a display screen of a display unit provided on a computer. Here, of the two computers 21 and 22, typically, the computer 21 will be explained. It is a similar as to the matter of the computer 22.

On a display screen 211a of the display 211 of the computer 21, there is displayed a list of icons corresponding to the associated monitored equipment units.

On the icon list shown in FIG. 2, there are displayed three keyboard icons 301, 302 and 303 representative of a keyboard, a storage icon 401 representative of a storage, and three display icons 501, 502 and 503 representative of a display.

On the screen of the icon list, there is displayed the storage icon 401 by one. Hence, it is readily understood that the storage icon 401 corresponds to the storage 41 of the network system 100 shown in FIG. 1. However, with respect to the keyboard icon and the display icon, there are displayed three keyboard icons 301, 302 and 303 and three display icons 501, 502 and 503. Thus, the correspondence between three keyboard icons 301, 302 and 303 and the keyboards 31, ..., 33 are unclear. And also the correspondence between three display icons 501, 502 and 503 and the displays 51, ..., 53 are unclear. The network system 100 shown in FIG. 1 has a function, which will be described hereinafter, in order to identify those correspondences. In the following explanation, there will be described mainly the keyboards by way of example.

Figure 3:
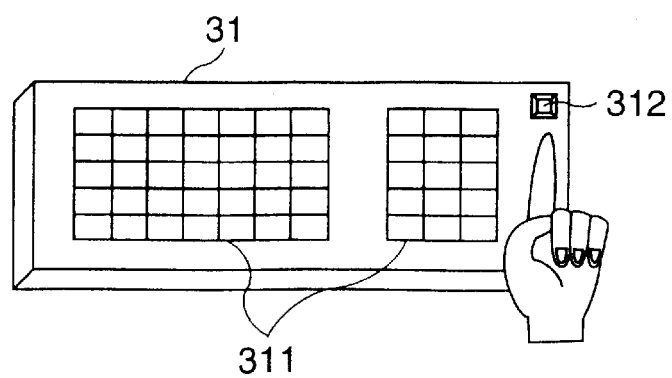
FIG. 3 is an illustration of an example of a keyboard constituting the network system shown in FIG. 1.

FIG. 3 is an illustration of an example of a keyboard constituting the network system shown in FIG. 1. Here, of the three keyboards shown in FIG. 1, typically, the keyboard 31 will be explained.

The keyboard 31 is provided with a key 312 for sending to the network 10 (cf. FIG. 1) ID information to specify one's own self in addition to a key 311 working as the keyboard. When the key 312 is depressed, the keyboard 31 sends to the network 10 ID information representative of the keyboard 31 itself.

Figure 4:
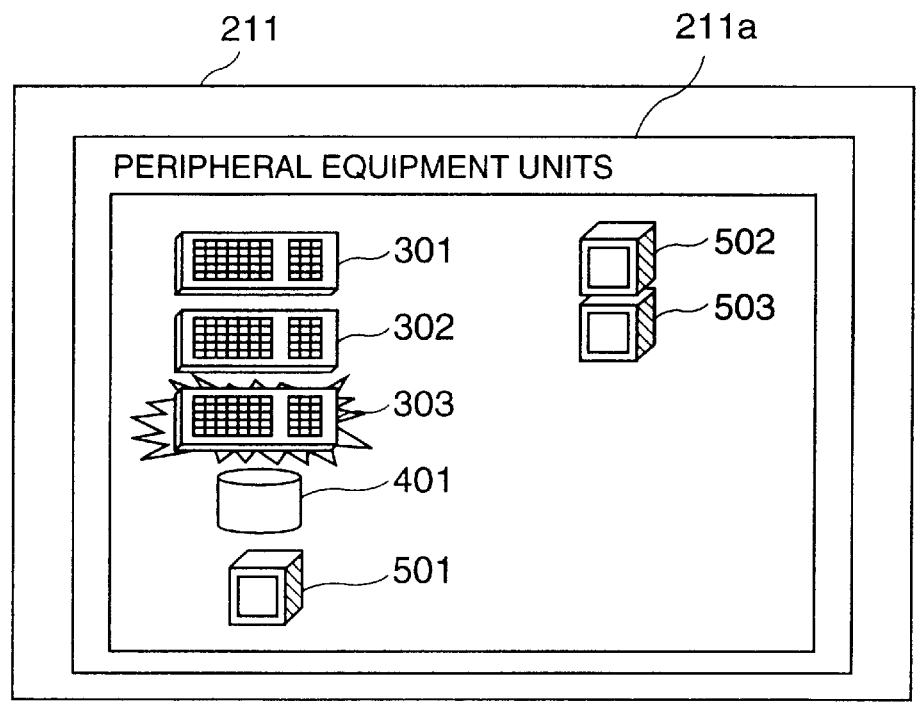
FIG. 4 is an illustration of an alternative example of an icon list displayed on a display screen of a display unit provided on a computer.

FIG. 4 is an illustration of an alternative example of an icon list displayed on a display screen 211a of a display 211 provided on the computer 21.

When the key 312 is depressed and the keyboard 31 sends ID information, the computer 21 receives the ID information and flashes an icon corresponding to a peripheral equipment (here the keyboard 31) designated by the ID, of the icon list displayed on the display screen 211a of the display 211.

When it is intended to know the correspondence between a peripheral equipment and an icon, first, a user performs a specific operation (in an example shown in FIG. 3, a depression of the key 311) for the peripheral equipment. And when the user looks at the display screen 211a of the display 211 provided on the computer 21, an icon corresponding to the peripheral equipment now operated is flashed. Thus, it is possible for the user to readily identify the icon corresponding to the peripheral equipment now operated.

Here, as shown in FIG. 3, the keyboard 31 is especially provided with the key 312 for sending the ID information. However, it is acceptable that no such especial key is provided, and an unusual operation of the key 311 for performing the primary working for the keyboard 31, for example, a simultaneous depression of a plurality of keys which are not simultaneously depressed usually, is substituted for the operation for sending the ID information.

Figure 5:
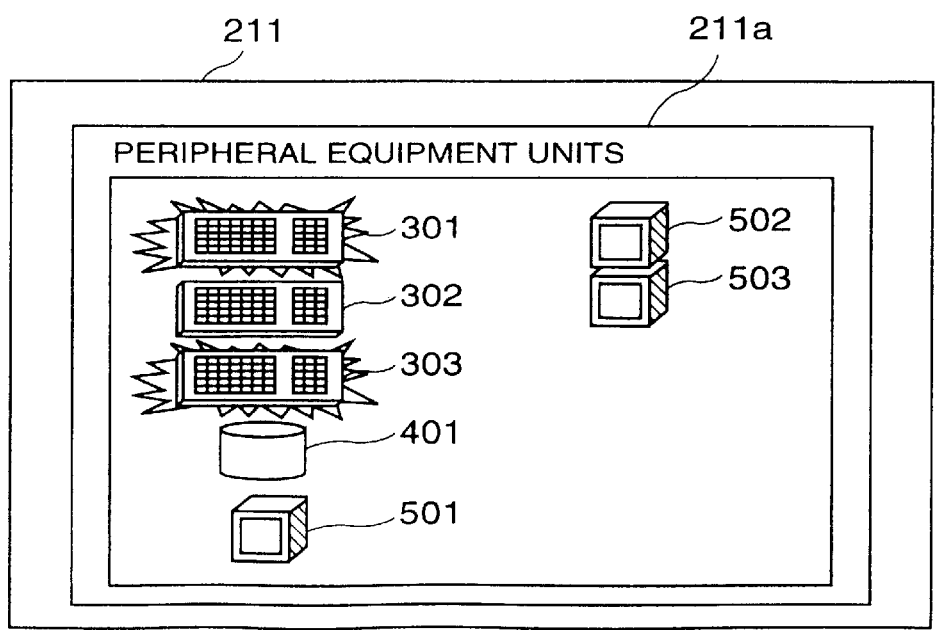
FIG. 5 is an illustration of another alternative example of an icon list displayed on a display screen of a display unit provided on a computer.

FIG. 5 is an illustration of another alternative example of an icon list displayed on a display screen 211a of a display unit 211 provided on the computer 21.

Here, two keyboard icons 301 and 303 of the three keyboard icons 301, 302 and 303 are simultaneously flashed. This means that in both the keyboard (for example, the keyboard 32) corresponding to the keyboard icon 301 and the keyboard (for example, the keyboard 31) corresponding to the keyboard icons 303, the operation for sending the ID information is performed. In the event that with respect to a plurality of peripheral equipment units, a specific operation is performed for the correspondence between the peripheral equipment units and the icons, it is acceptable that as shown in FIG. 5, a plurality of icons corresponding to the plurality of peripheral equipment units undergoing the specific operation are displayed on a display scheme (here, on a flashing basis) indicative of the peripheral equipment units undergoing the specific operation. In such a case too, in the event that the types of the peripheral equipment units are quite different (for example, in case of the keyboard and the display), it is possible to readily identify the correspondence between the peripheral equipment units and the icons. And in addition there is no need to confirm the display screen one by one and it is sufficient for a user to confirm the display screen on a batch basis. Thus it is possible to improve the operability. On the other hand, in the event that all the plurality of icons are icons representative of the same type of peripheral equipment units (for example, in case of a plurality of keyboards), the correspondence is unclear. However, in the event that there is no need to identify the correspondence on a one-to-one basis, for example, in the event that there is provided such a control that two keyboards 32 and 31 corresponding to two icons 301 and 303 illustrate ed in FIG. 5 are simultaneously connected to the computer 21 or simultaneously disconnected from the computer 21, it is possible to save a trouble as compared with a case where the same control is performed for each keyboard.

Figure 6:
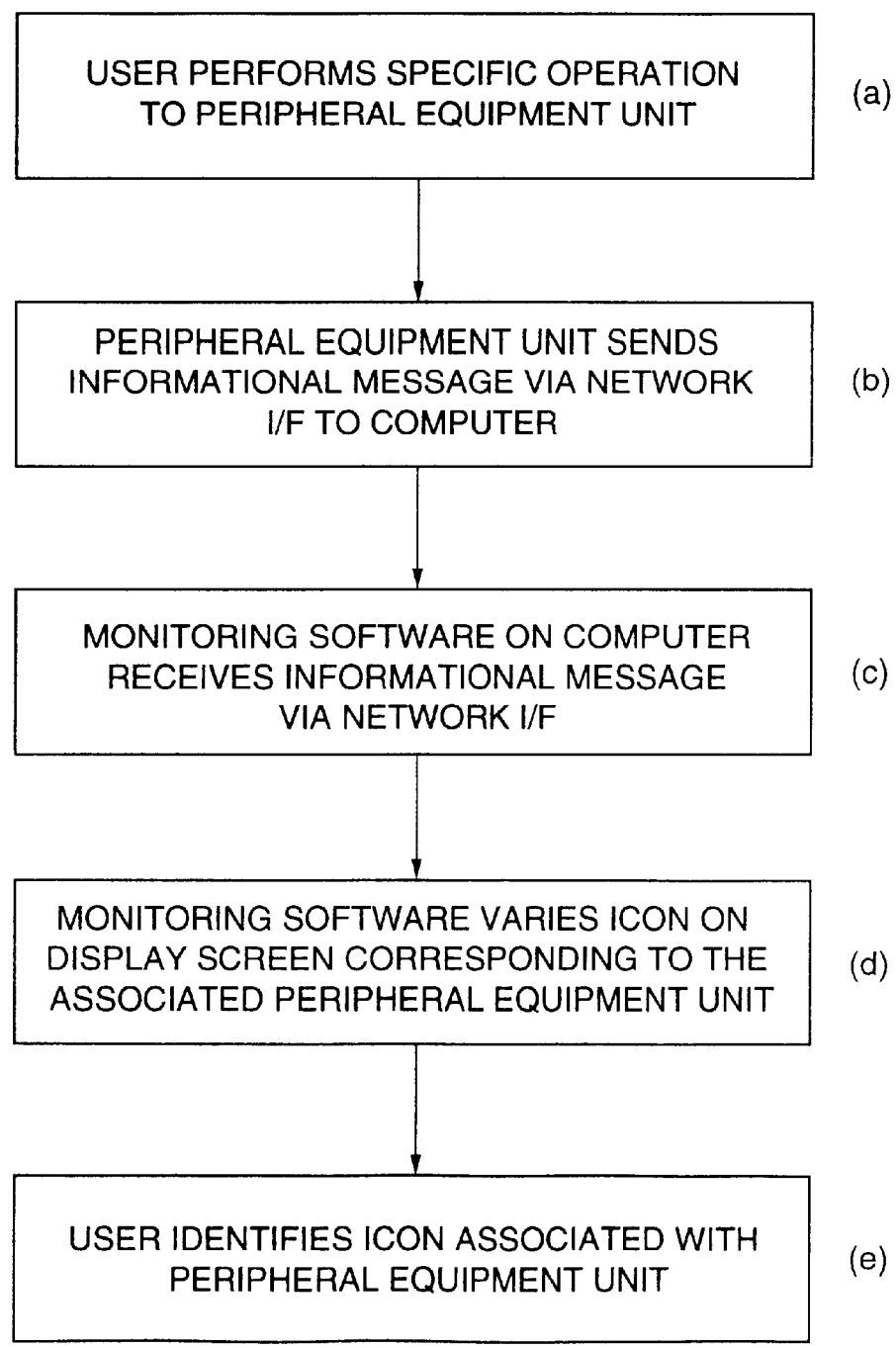
FIG. 6 is an explanatory view useful for understanding a procedure for a correspondence between a peripheral equipment and an icon.
Figure 7:
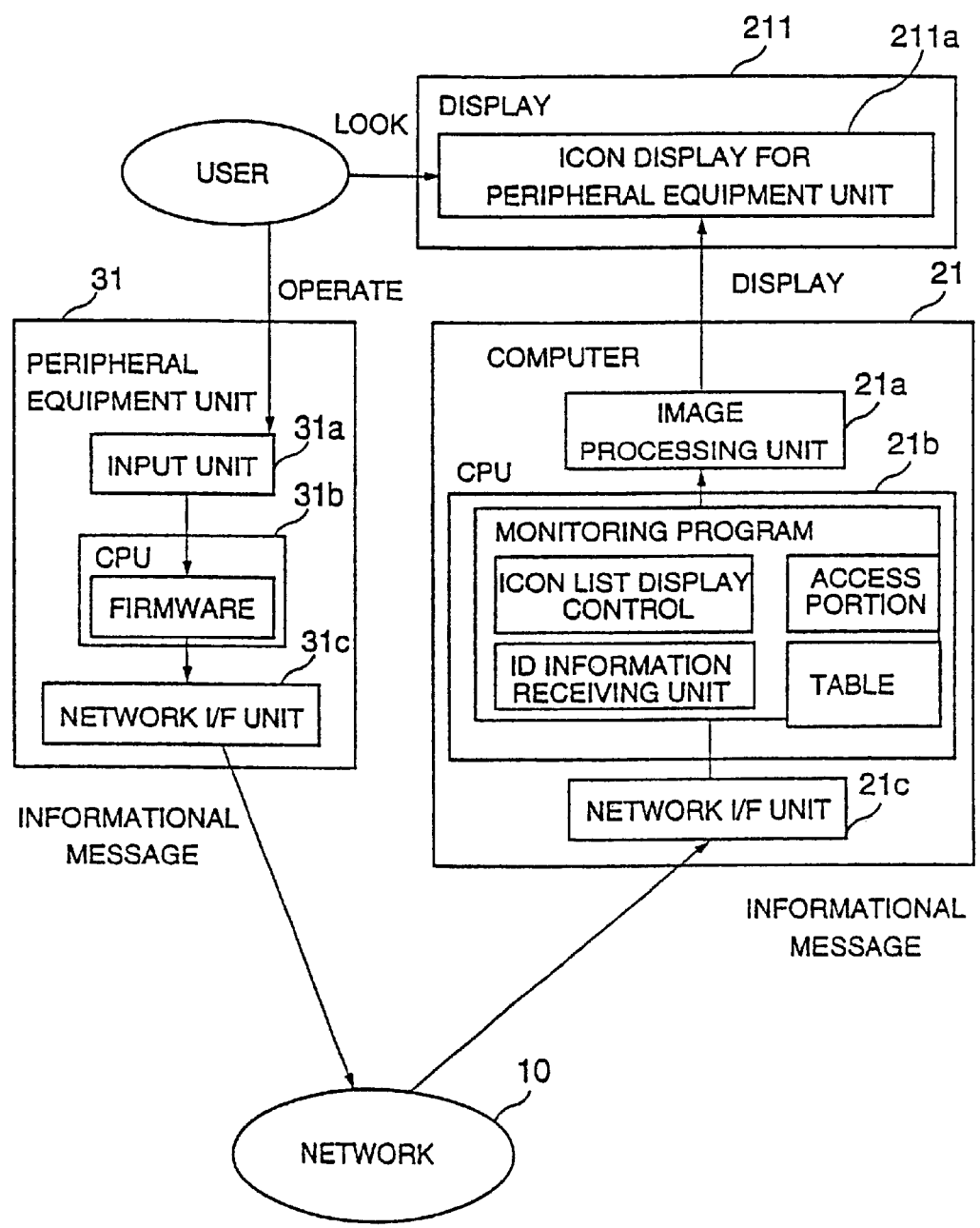
FIG. 7 is an illustration showing an internal structure of a peripheral equipment (here a keyboard) and a computer, and a flowchart of information according to the procedure shown in FIG. 6.

FIG. 6 is an explanatory view useful for understanding a procedure for a correspondence between a peripheral equipment and an icon. FIG. 7 is an illustration showing an internal structure of a peripheral equipment (here a keyboard) and a computer, and a flowchart of information according to the procedure shown in FIG. 6.

Here, there will be omitted illustrations and explanations of the structure as to the primary function of a peripheral equipment, and the blocks as to the function of a control of the peripheral equipment, and only the essential features of the present invention will be explained in conjunction with the figures. This is the same as other figures.

A peripheral equipment (here, keyboard 31) shown in FIG. 7 is provided with an input unit 31a, a CPU 31b including a firmware, and a network I/F unit 31c.

The input unit 31a comprises the key 312 for sending ID information as shown in FIG. 3 and a circuit arrangement for transmitting operation information of the key 312 to the CPU 31b. The CPU 31b enables the firmware in response to an operation of the key 312 to prepare and send informational message including ID information of the peripheral equipment to the network I/F unit 31c. The network I/F unit 31c sends the ID information transmitted from the CPU 31b to the network 10 toward the computer 21.

The computer 21 shown in FIG. 7, which is connected to the display 211, comprises an image processing unit 21a, a CPU 21b on which a monitoring software is operable, and a network I/F unit 21c.

The network I/F unit 21c transfers, upon receipt of an informational message transmitted via the network 10, the same to the CPU 21b. The CPU 21b enables the monitoring software, when the network I/F unit 21c receives the informational message, to receive the informational message through the network I/F unit 21c so that it is recognized what peripheral equipment is represented by the ID information included in the informational message thus received, and specifies the recognized peripheral equipment and instructs the image processing unit 21a to alter the display of the specified peripheral equipment. The image processing unit 21a causes the display 211 to display on the display screen 211a an icon list indicative of a corresponding between the peripheral equipment units and the icons regardless of reception of the informational message and to flash the indicated icon in accordance with the instruction from the CPU 21b.

In the present embodiment, the ID information receiving unit operable in the CPU 21b for recognizing ID information of an informational message received by the network I/F unit 21c corresponds to the ID information receiving means of the monitoring program referred to in the present invention. And the icon list display control unit operable in the CPU 21b for controlling the image processing unit 21a to cause the display 211 to display on the display screen 211a an icon list indicative of a corresponding between the peripheral equipment units and the icons and upon receipt of informational message to flash the icon according to the ID information of the informational message is the symbol list display control means of the monitoring program referred to in the present invention.

Incidentally, an access portion and a table on the monitoring program shown in FIG. 7 are the structural elements necessary for modifications of the present embodiment which will be explained referring to FIG. 8, and the access portion and the table will be explained in conjunction with the explanation of the modifications of the present embodiment.

Next, there will be explained the respective steps in FIG. 6 referring to FIGS. 6 and 7.

First, a user performs an input operation for specifying a peripheral equipment unit of concern in correspondence with an icon (step a). In the present embodiment, the key 312 for use in sending of the ID information for the keyboard 31 shown in FIG. 3 is depressed. Then, it is informed from the input unit 31a of the peripheral equipment unit (the keyboard 31) to the CPU 31b that the key 312 was depressed. In response to this information, the CPU 31b enables the firmware to prepare information representative of ID of one's own self and transmit the ID information thus prepared to the network I/F unit 31c. The network I/F unit 31c transmits the ID information via the network 10 to the computer 21 (step b).

The computer 21 receives the informational message thus transmitted through the network I/F unit 21c and transfers the same to the CPU 21b (step c). In CPU 21b, the monitoring software is activated to analyze the transmitted informational message to identify the associated peripheral equipment unit. The monitoring software controls the image processing unit 21a to flash an icon corresponding to the associated peripheral equipment unit on the display screen of the display (step d).

The user observes the display screen 211a of the display 211 provided on the computer 21 to confirm the flashing icon (step e). Thus, the user knows the correspondence between the operated peripheral equipment unit and the associated icon.

Next, there will be described modifications of the first embodiment of the network system of the present invention.

Figure 8:
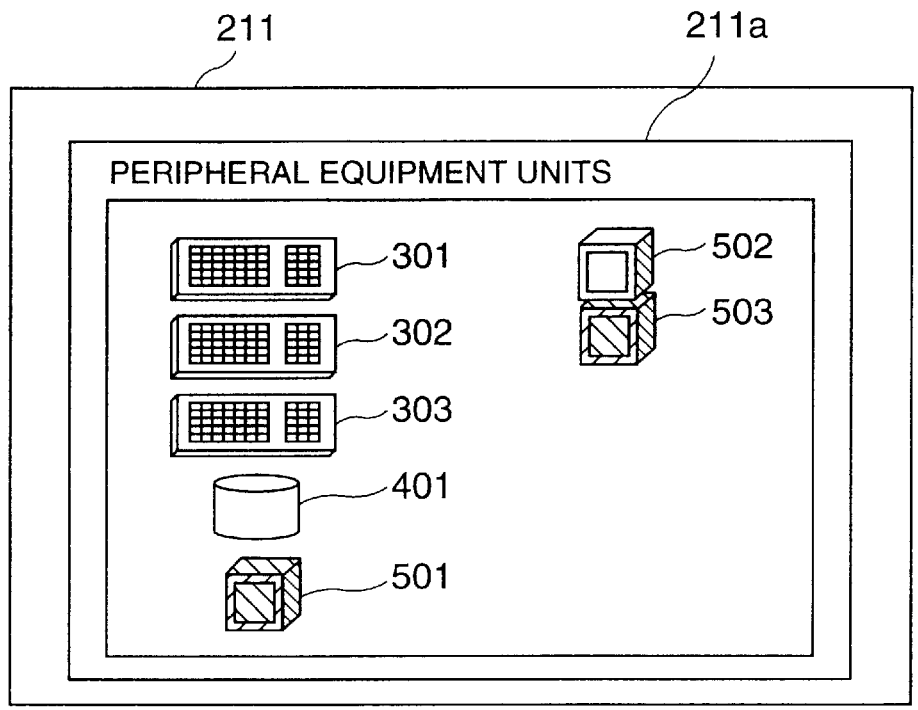
FIG. 8 is an illustration of further alternative example of an icon list displayed on a display screen of a display unit provided on a computer.

FIG. 8 is an illustration of further alternative example of an icon list displayed on the display screen 211a of the display unit 211 provided on the computer 21. Here, of three display icons 501, 502 and 503, two display icons 501 and 503 are displayed in different color (e.g. blue). Table 1, as set forth below, shows an example of a table (cf. FIG. 7), which is held by a monitoring software and is referred to by the monitoring software. This table corresponds to an example of the selection information recording unit referred to in the present invention.

TABLE 1

| Number | ID | Type of equipment units | States of selection |
|---|---|---|---|
| 1 | 12345 | Keyboard | OFF |
| 2 | 23232 | Keyboard | OFF |
| 3 | 86432 | Keyboard | OFF |
| 4 | 15465 | Storage | OFF |
| 5 | 59321 | Display | ON |
| 6 | 52251 | Display | OFF |
| 7 | 12815 | Display | ON |

The monitoring program holds Table-1 as set forth above. Table-1 has a column indicative of ID information or the like for each of the peripheral equipment units connected to the network. In association with each of the peripheral equipment units, there is provided an item to indicate the "States of selection" which is expressed with one bit. This item indicates that the associated peripheral equipment unit is in the "selected state" (ON) or the "non-selected state" (OFF). According to the monitoring program, information of the "States of selection" can be utilized to perform on a batch basis any operation for a single or plurality of peripheral equipment units which offer the ON in the "States of selection". For example, when a user operates a mouse to click an icon (not illustrated) for instructing the transition to a power saving mode on a window, the monitoring program detects the fact that the icon was clicked, and the access portion of the monitoring program reads the table, so that the monitoring program sends to all the peripheral equipment units involved in the "selected state" a communication packet instructing the transition to the power saving mode. In this manner, simultaneously establishing a plurality of peripheral equipment units in the "selected state" makes it possible to perform a control for the plurality of peripheral equipment units through an operation by the user by one time. Further, on the display screen on which a list of icons corresponding to the respective peripheral equipment units is displayed, as shown in FIG. 8, according to the monitoring program, icons corresponding to the peripheral equipment units involved in the "selected state" are displayed in different color from that for icons corresponding to the peripheral equipment units involved in the "non-selected state" (according to the example shown in FIG. 8, the peripheral equipment units involved in the "selected state" are displayed in blue).

According to the example shown in FIG. 8, of three display icons 501, 502 and 503, two display icons 501 and 503 are displayed in blue. And in the table shown in Table 1, the state of selection as to two displays of three displays is concerned with ON.

Here, of three displays 51, 52 and 53, two displays 51 and 53 correspond to display icons 501 and 503, respectively. Here, with respect to the displays 51 and 53, a predetermined operation is performed to know the correspondence between the displays and the display icons. According to the above-mentioned examples (for example, the respective examples explained referring to FIGS. 4 and 5), the icons corresponding to the periphery equipment units subjected to the predetermined operation a re simply altered in display format, but nothing refers to the transition of the periphery equipment units to the selected state as mentioned above. It is acceptable that the transition of the periphery equipment unit s to the selected state is established according as the need arises, after alteration of the display form at. However, according to the pre sent embodiment, when the predetermined operation is performed, the monitoring program operative on the CPU 21b brings about not only an alteration of the display state, but also an establishment of the selected state "ON" in the column of the peripheral equipment unit corresponding to the icon altered in the display state, in the table (cf. FIG. 7 and Table-1) . This feature may avoid the necessity for the independent operation for establishing the peripheral equipment unit into the selected state, in the event that other than the purpose of simply recognizing the correspondence between the peripheral equipment unit and the icon, any operation is performed for the peripheral equipment unit upon recognizing the correspondence.

Next, there will be described a further alternative modification of the first embodiment of the network system according to the present invention.

Figure 9:
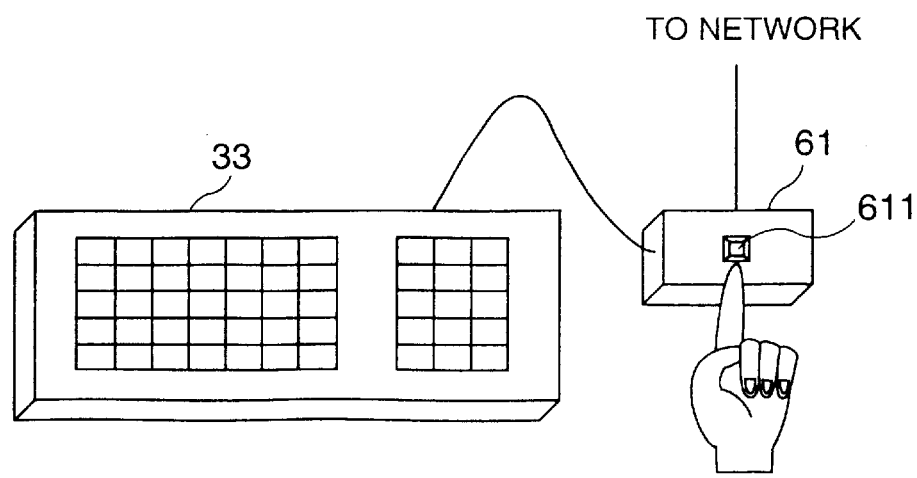
FIG. 9 is an illustration of one of three keyboards (cf.

FIG. 9 is an illustration of one keyboard 33 of three keyboards 31, . . . 33 (cf. FIG. 1) and an adapter connected to the keyboard 33.

The keyboard 33 is a usual keyboard having no function of sending ID information as the conventional keyboard, while the keyboard 31 shown in FIG. 3 is provided with the key 312 for sending ID information. According to this modification, there is provided with an adapter 61 associated with the keyboard 33 between the keyboard 33 and the network. The adapter 61 is provided with a key 611 having the same function as the key 312 for sending ID information on the keyboard 31 shown in FIG. 3.

Figure 10:
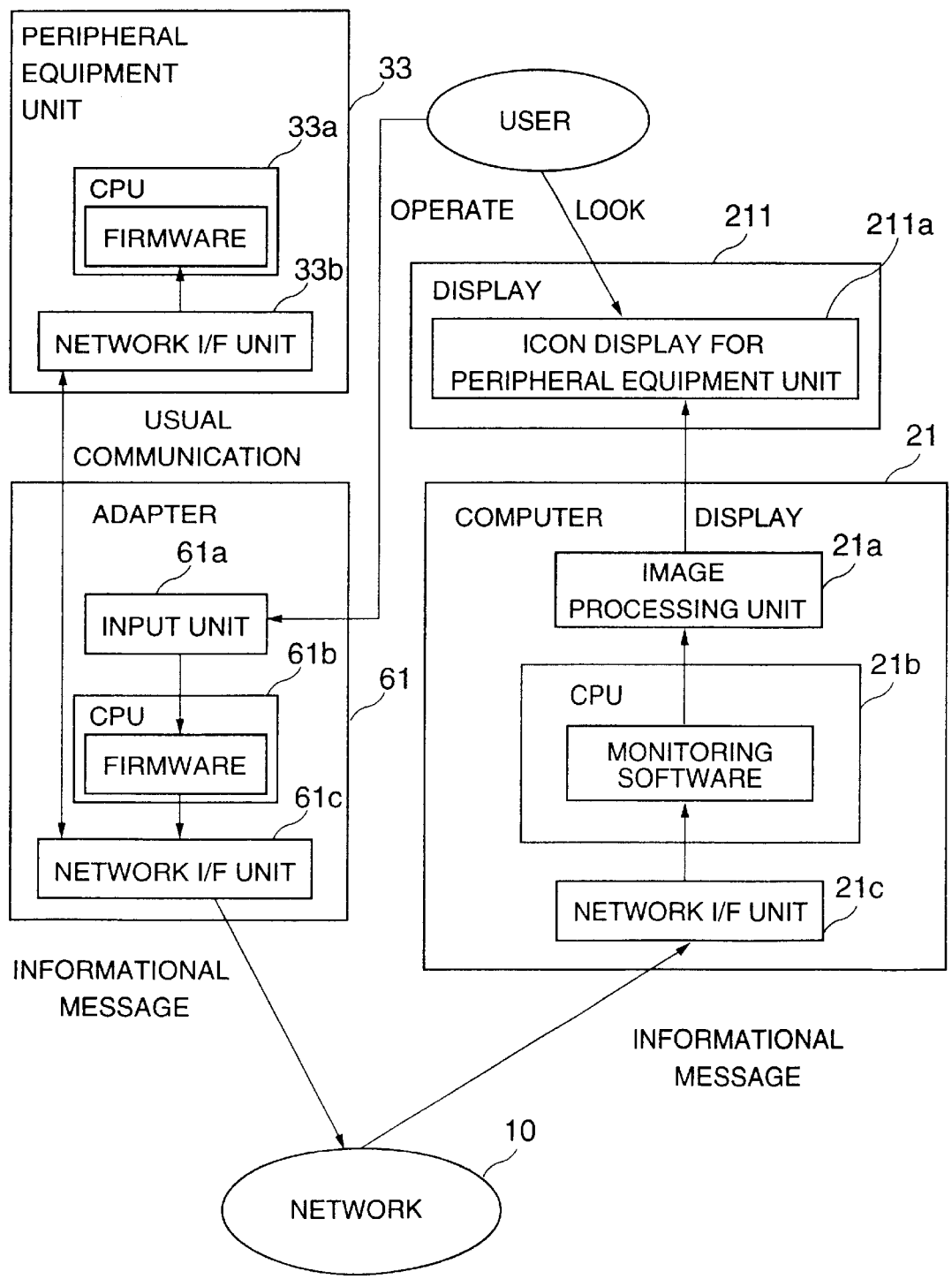
FIG. 10 is an illustration showing an internal structure (only a part associated with an explanation of the features of the present invention) of a peripheral equipment (here a keyboard), the adapter as shown in FIG. 9 and a computer, and a flowchart of information.

FIG. 10 is an illustration showing an internal structure (only a part associated with an explanation of the features of the present invention) of a peripheral equipment unit (here a keyboard), the adapter as shown in FIG. 9 and a computer, and a flowchart of information.

A peripheral equipment unit (here a keyboard 33) is provided with a CPU 33a including a firmware and a network I/F unit 33b. The CPU 33a controls the peripheral equipment unit (here a keyboard 33) in its entirety. The network I/F unit 33b serves as means for transmitting and receiving information between the CPU 33a and the network 10.

An adapter 61 is provided with an input unit 61a, a CPU 61b including a firmware and a network I/F unit 61c. The input unit 61a comprises the key 611 for sending ID information as shown in FIG. 9 and a circuit arrangement for transmitting operation information of the key 611 to the CPU 61b. The CPU 61b enables the firmware in response to an operation of the key 611 to prepare and send ID information for specifying the adapter (that is, specifying the peripheral equipment unit associated with the adapter) to the network I/F unit 61c. The network I/F unit 61c sends the ID information transmitted from the CPU 61b to the network 10 toward the computer in the form of an informational message. The computer 21 shown in FIG. 10 has the same structure as the computer 21 shown in FIG. 7. But, in the computer 21 shown in FIG. 10, the icon list display control unit and the ID information receiving unit, which constitute the monitoring program, are omitted in illustration. Further, the access portion and the table, which are necessary for the modifications explained referring to FIGS. 8 and Table-1, are also omitted in illustration. With respect to an explanation for the processing at the computer 21 end receiving the communication message transmitted from the adapter 61, it is the same as that made referring to FIG. 7, and thus the redundant explanation will be omitted.

In case of the usual communication except for the informational message informing ID information, the communication is directly performed between the network I/F unit 33b of the peripheral equipment unit (the keyboard 33) and the network I/F unit 61c of the adapter 61. That is, a message to be transmitted from the peripheral equipment unit (the keyboard 33) to the network 10 is sent from the network I/F unit 33b of the peripheral equipment unit (the keyboard 33) to the network I/F unit 61c of the adapter 61. The network I/F unit 61c of the adapter 61 sends the message to the network 10. On the other hand, a message transmitted via the network 10 is received by the network I/F unit 61c of the adapter 61 and then transferred to the network I/F unit 33b of the peripheral equipment unit (the keyboard 33).

A provision of such an adapter makes it possible to incorporate the peripheral equipment unit having no function of sending ID information into the network system.

Next, there will be described the second embodiment of the present invention. Also in the second embodiment, the network system is illustrated in its entire structure in FIG. 1 and the icon list to be displayed on the display screen of the display 211 of the computer 21 is represented by FIG. 2.

Figure 11:
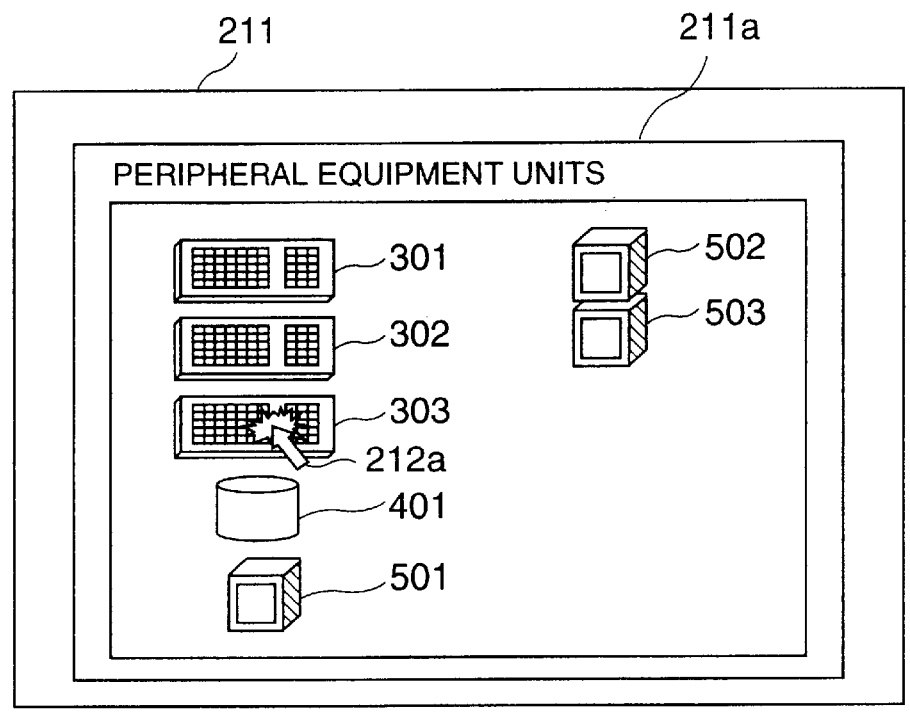
FIG. 11 is an illustration of an example of an icon list displayed on a display screen shown for the purpose of an explanation of the feature of a second embodiment of the present invention.

FIG. 11 is an illustration of an example of an icon list displayed on a display screen shown for the purpose of an explanation of the feature of a second embodiment of the present invention.

The mouse 212 (cf. FIG. 1) is operated in such a manner that a mouse cursor 212a is superposed on a desired icon (here a keyboard icon 303) on the screen for the icon list shown in FIG. 1 and the icon 303 is clicked. Then, the computer 21 detects the click and sends to the peripheral equipment unit (the keyboard 31) corresponding to the clicked icon 303 an informational message indicative of the fact that the peripheral equipment unit is designated, for the purpose of confirmation as to the correspondence with the icon.

Figure 12:
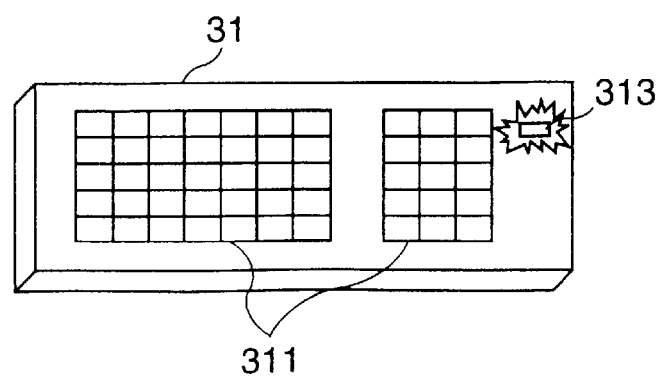
FIG. 12 is a typical illustration showing an example of a keyboard suitable for the second embodiment of the present invention.

FIG. 12 is a typical illustration showing an example of a keyboard suitable for the second embodiment of the present invention. FIG. 12 corresponds to FIG. 3 related to the above-mentioned first embodiment.

A keyboard 31 shown in FIG. 12 is provided with a lamp 313 in addition to a key 311 which serves as a keyboard. When the keyboard 31 receives from the computer 12 an informational message indicative of that oneself is designated, the lamp turns on.

That is, when it is intended to know the correspondence between a certain icon and the associated peripheral equipment unit, first, a desired icon on the icon list screen is clicked through a mouse operation in the computer 21 end. And thereafter, a peripheral equipment unit, which is deemed to be associated with the clicked icon, for example, the keyboard 31 shown in FIG. 31, is verified. If the lamp 313 turns on, it means that the keyboard 31 is the peripheral equipment unit corresponding to the clicked icon.

According to the embodiment shown in FIG. 12, the keyboard 31 is provided with a specific equipment (here the lamp 313) for verifying the correspondence with the icon. However, in the event that the peripheral equipment unit is originally provided with a display function or a sound function, there is no need to provide such a specific equipment. And it is acceptable that the display function or the sound function are utilized to inform that oneself is designated, without providing such a specific equipment unit.

Figure 13:
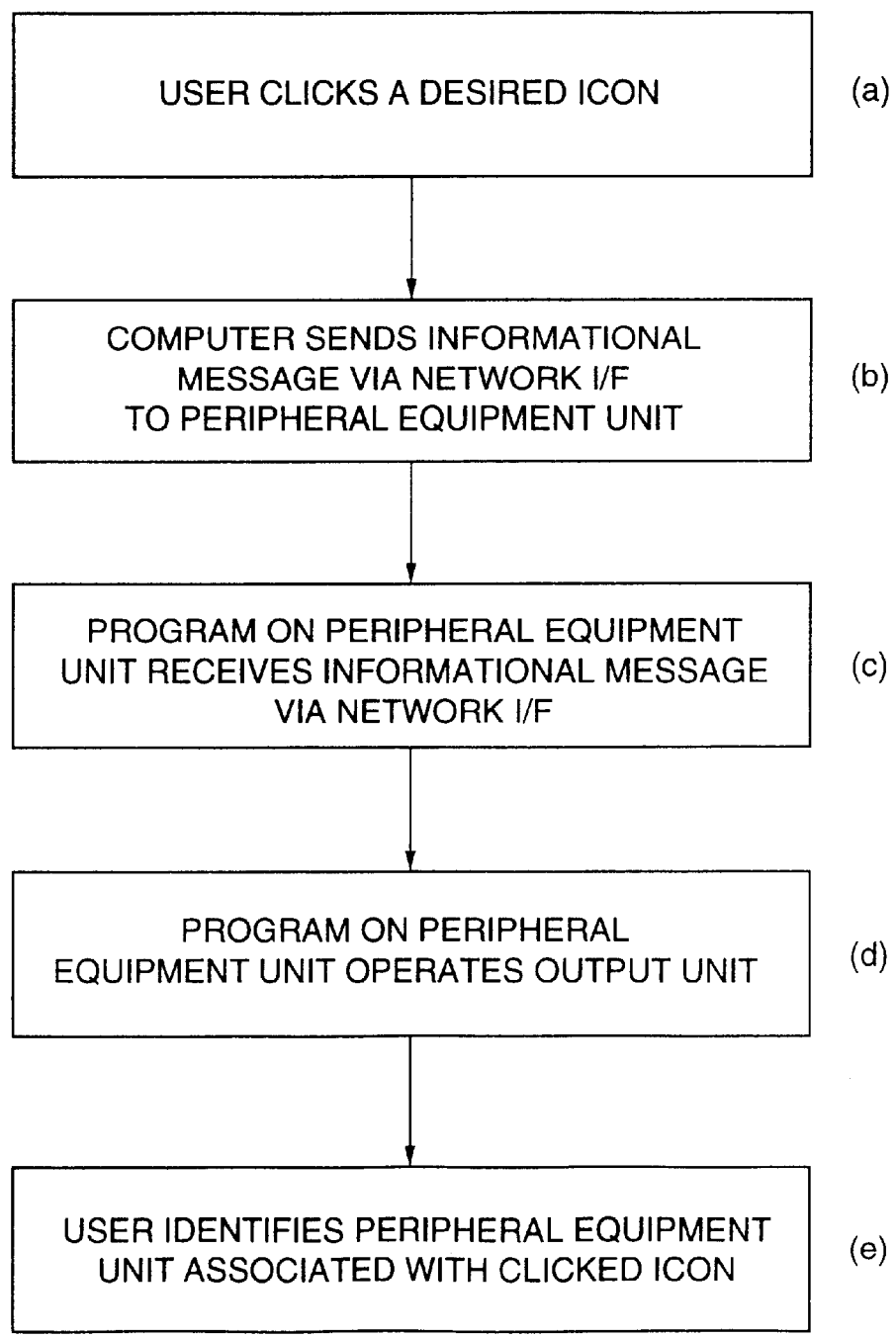
FIG. 13 is an explanatory view useful for understanding a procedure for a correspondence between a peripheral equipment and an icon in connection with the second embodiment of the present invention.
Figure 14:
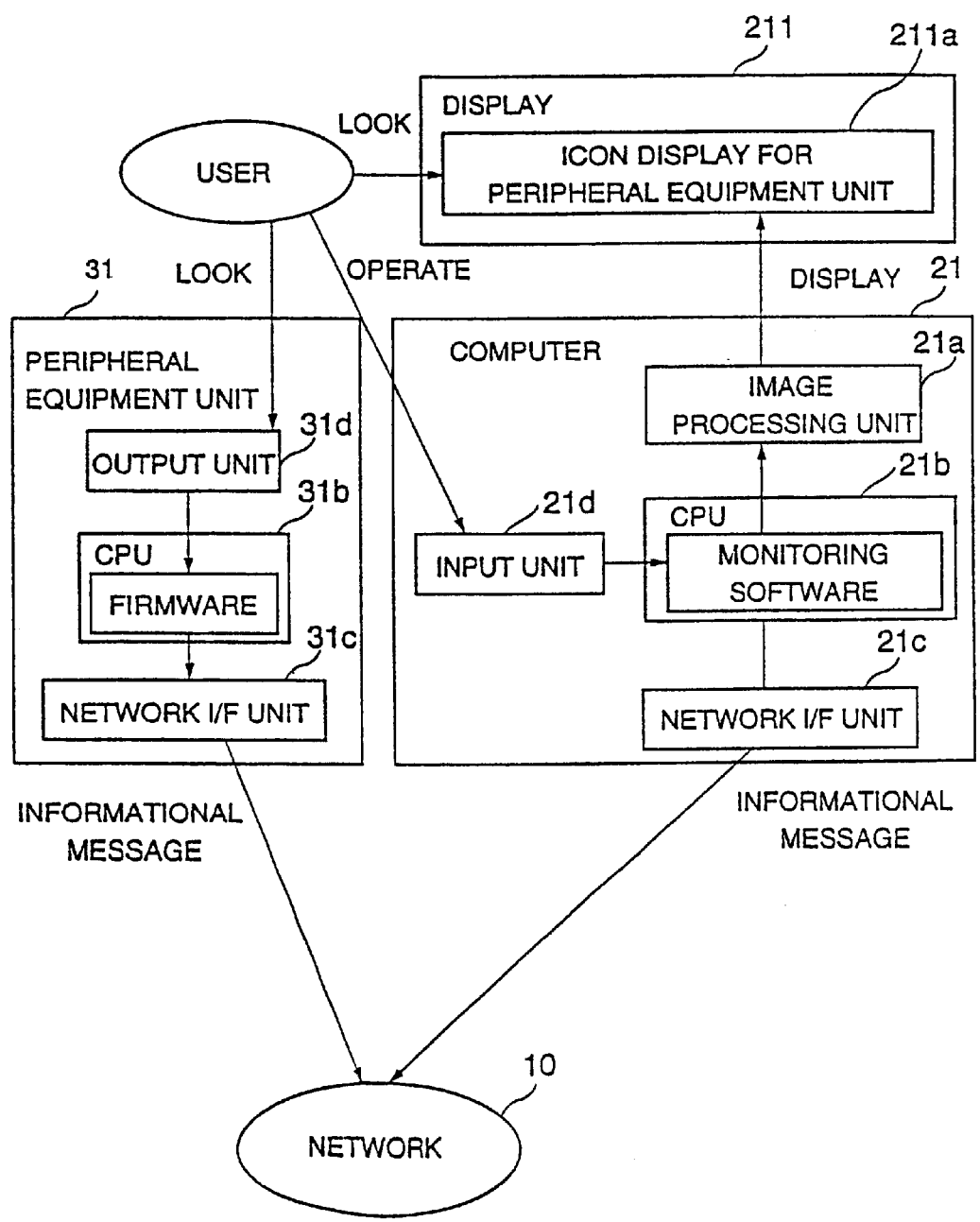
FIG. 14 is an illustration showing an internal structure of a peripheral equipment (here a keyboard) and a computer, and a flowchart of information according to the procedure shown in FIG. 13.

FIG. 13 is an explanatory view useful for understanding a procedure for a correspondence between a peripheral equipment and an icon in connection with the second embodiment of the present invention. FIG. 14 is an illustration showing an internal structure of a peripheral equipment (here a keyboard) and a computer, and a flowchart of information according to the procedure shown in FIG. 13. FIG. 14 corresponds to FIG. 7 related to the above-mentioned first embodiment. In FIG. 14, the same parts are denoted by the same reference numbers as those of FIG. 7.

The computer 21 comprises the image processing unit 21a, the CPU 21b including a monitoring software, the network I/F unit 21c and an input unit 21d.

The input unit 21d comprises the mouse 212 shown in FIG. 1 and a circuit structure for transmitting an operation of the mouse to the CPU 21b. The image processing unit 21a causes the display 211 of the computer 21 to display the icon list and the muse cursor 212a on the display screen, as shown in FIG. 11, in accordance with the instruction from the CPU 21b. When a user operates the mouse 212 to click a certain icon (here the keyboard icon 303 as shown in FIG. 11) (step a in FIG. 13), the monitoring software operative on the CPU 21b identifies the clicked icon, and prepares an informational message indicating that the peripheral equipment unit (here keyboard 31) corresponding to the clicked icon is designated and sends the informational message to the network I/F unit 21c directed to the designated peripheral equipment unit. The network I/F unit 21c sends the informational message transmitted from the CPU 21b via the network 10 to the peripheral equipment unit (here keyboard 31) (step b in FIG. 13).

The peripheral equipment unit (here keyboard 31) is provided with a CPU 31b including a firmware, a network I/F unit 31c, and an output unit 31d.

The informational message transmitted from the computer 21 is received by the network I/F unit 31c of the peripheral equipment unit (here keyboard 31) and is transferred to the firmware operative on the CPU 31b (step c in FIG. 13), so that the firmware recognizes the contents of the informational message. When it is recognized that the informational message is an informational message designating one's own for a recognition of the correspondence with the icon, the output unit 31d is activated (step d in FIG. 13). The output unit 31d comprises a lamp 313 shown in FIG. 12 and a circuit structure for turning on and off the lamp 313. When the informational message recognized by the CPU 31b is an informational message designating one's own, the output unit 31d causes the lamp 313 to turn on. The turn-on of the lamp 313 is verified by the user, so that the user specifies the peripheral equipment unit corresponding to the icon clicked by one's own (step e in FIG. 13). According to the above embodiment, the output unit 31d comprises a lamp 313 shown in FIG. 12 and a circuit structure for turning on and off the lamp 313. It is acceptable to provide such an arrangement that the designation of one's own is informed by voice or sound other than the turn-on and turn-off of the lamp 313. Or in some peripheral equipment unit, it is acceptable to provide such an arrangement that the designation of one's own is informed by a movement of the peripheral equipment unit.

Next, there will be described modifications of the second embodiments of the network system according to the present invention.

Figure 15:
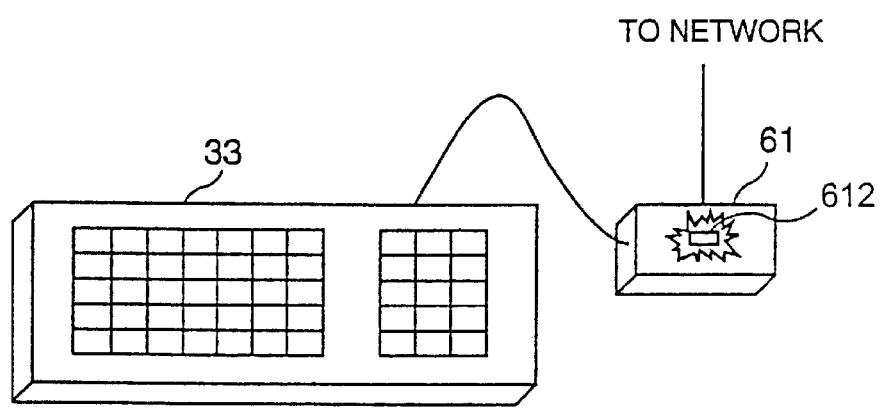
FIG. 15 is an illustration of one of three keyboards (cf.

FIG. 15 is an illustration of one keyboard 33 of three keyboards 31, . . . , 33 (cf. FIG. 1) and an adapter connected to the keyboard 33.

While the keyboard shown in FIG. 12 is provided with the lamp 313 for indicating the designation of one's own, the keyboard 33 is the usual keyboard having no such a function of indicating the designation of one's own. Here, there is disposed an adapter 61 associated with the keyboard 33 between the keyboard 33 and the network. The adapter 61 is provided with a lamp 612 having the same function as the lamp 313 for indicating the designation of one's own in the keyboard 31 shown in FIG. 12.

Figure 16:
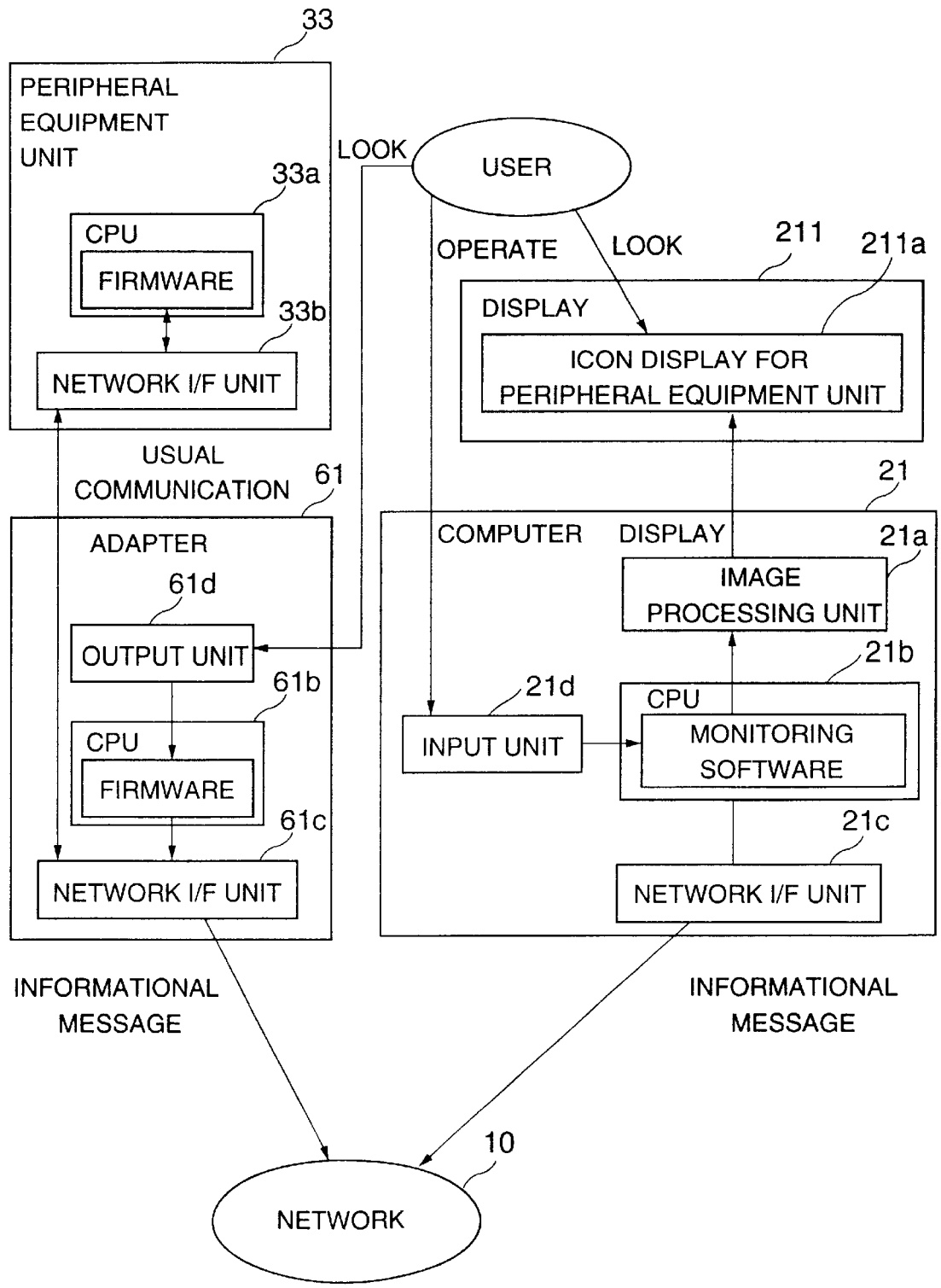
FIG. 16 is an illustration showing an internal structure (only a part associated with an explanation of the features of the present invention) of a peripheral equipment (here a keyboard), the adapter as shown in FIG. 15 and a computer, and a flowchart of information.

FIG. 16 is an illustration showing an internal structure (only a part associated with an explanation of the features of the present invention) of a peripheral equipment (here a keyboard), the adapter as shown in FIG. 15 and a computer, and a flowchart of information.

An arrangement of the computer 21 side is the same as that shown in FIG. 14, and thus a redundant description will be omitted. An arrangement of the peripheral equipment unit (here keyboard 33) is the same as that shown in FIG. 10, and thus redundant description will be omitted.

An adapter 61 comprises a CPU 61b including a firmware, a network I/F unit 61c, and an output 61d.

The network I/F unit 61c of the adapter 61 receives an informational message transmitted from the computer 21 via the network 10 and transfers the informational message to the firmware operative on the CPU 61b, so that the firmware recognizes the content of the informational message. When it is recognized that the informational message is an informational message designating a peripheral equipment unit (here keyboard 33) by one's own for a verification of the correspondence with the icon, the output unit 61d is activated. The output unit 61d comprises a lamp 612 shown in FIG. 15 and a circuit structure for turning on and off the lamp 612. When the informational message recognized by the CPU 61b is an informational message designating the peripheral equipment unit corresponding to one's own, the output unit 61d causes the lamp 612 to turn on. The turn-on of the lamp 612 is verified by the user, so that the user specifies the peripheral equipment unit corresponding to the icon clicked by one's own.

The network I/F unit 61c of the adapter 61 has a function of discriminating as to whether the received message is an informational message for the correspondence with the icon as mentioned above. In the event that the network I/F unit 61c receives such an informational message, the network I/F unit 61c transmits the same informational message to the CPU 61b. On the other hand, in the event that the network I/F unit 61c receives a message other than such an informational message, the network I/F unit 61c directly transmits the same message to the network I/F unit 33b of the associated peripheral equipment unit (here keyboard 33). The network I/F unit 61c of the adapter 61 sends directly to the network 10 a message transmitted from the network I/F unit 33b of the associated peripheral equipment unit (here keyboard 33).

A provision of such an adapter makes it possible to incorporate even the peripheral equipment unit having no function of indicating the designation of one's own into the network system.

Figure 17:
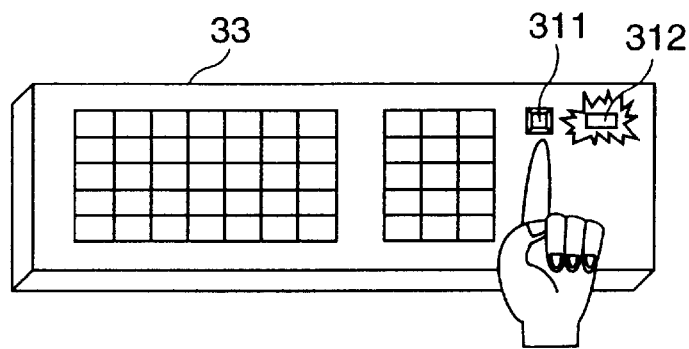
FIG. 17 is an illustration showing an alternative embodiment of a keyboard according to the present invention.

FIG. 17 is an illustration showing an alternative embodiment of a keyboard according to the present invention.

The keyboard 31 shown in FIG. 17 is provided with both the key 311 for sending ID information and a lamp 312 which turns on when one's own is designated. Thus, this keyboard 31 can be incorporated into network systems of any of the above-mentioned first and second embodiments, and also a network system capable of performing a correspondence verification in dual directions (one direction in which a peripheral equipment unit is designated to find out an icon associated with the peripheral equipment unit, and another direction in which an icon is designated to find out a peripheral equipment unit associated with the icon) through a combination of the first and second embodiments.

Figure 18:
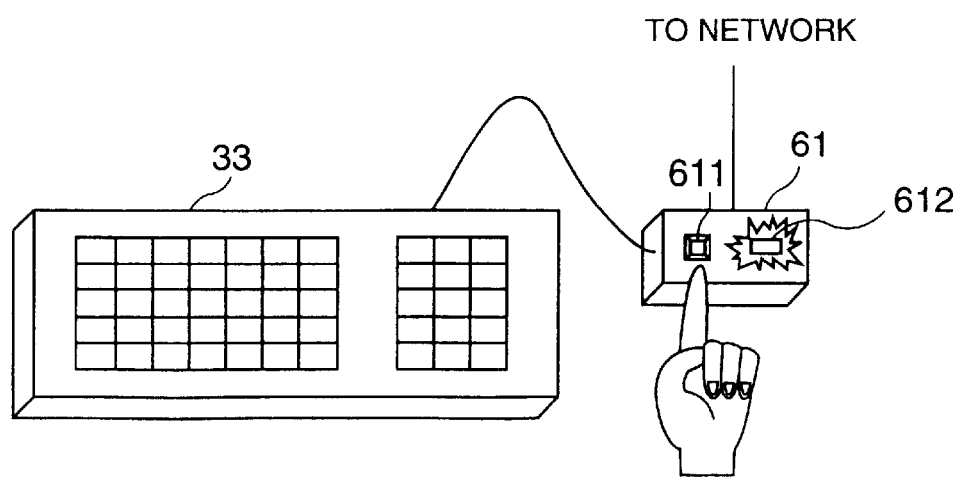
FIG. 18 is an illustration showing an alternative embodiment of an adapter according to the present invention.

FIG. 18 is an illustration showing an alternative embodiment of an adapter according to the present invention.

The adapter shown in FIG. 18 is provided with both the key 611 for sending ID information and a lamp 612 which turns on when a peripheral equipment unit (here keyboard 33) corresponding to one's own is designated. Thus, a provision of this adapter makes it possible to incorporate the conventional peripheral equipment unit having no structural feature of the present invention into network systems of any of the above-mentioned first and second embodiments, and also a network system having a correspondence verification function with both the first and second embodiments.

As mentioned above, according to the present invention, even if a single network system includes a plurality of same type of monitored equipment units, it is possible to readily recognize the association between symbols on the monitoring equipment side and the monitored equipment units.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A network system in which a monitoring equipment and a plurality of monitored equipment units are interconnected through a network, wherein each of said plurality of monitored equipment units has ID information sending means for sending to said monitoring equipment, ID information to identify one's own self through a predetermined operation for oneself, said monitoring equipment comprises ID information receiving means for receiving ID information transmitted, a display screen, and symbol list display means for displaying on said display screen a list of symbols each corresponding to an associated one of said plurality of monitored equipment units, and said symbol list display means displays, upon receipt of the ID information by said ID information receiving means, a symbol associated with a monitored equipment unit identified by the received ID information, in the list of symbols displayed on said display screen, in a display format different from a display format for other symbols.

2. A network system according to claim 1, wherein an adapter for mediating a communication through the network is provided for a monitored equipment unit in association with part or whole of said plurality of monitored equipment units, and as to the monitored equipment unit having the adapter of said plurality of monitored equipment units, instead of that the monitored equipment unit having the adapter is provided with said ID information sending means, the adapter comprises a handler and ID information sending means for sending to said monitoring equipment, ID information to identify the monitored equipment unit having the adapter through an operation of said handler.

3. A network system according to claim 1, wherein in the event that said ID information receiving means receives a plurality of pieces of ID information, said symbol list display means displays a plurality of symbols associated with a plurality of monitored equipment units identified by the plurality of pieces of ID information received in a display format different from a display format for symbols other than said plurality of symbols.

4. A network system according to claim 1, wherein said monitoring equipment further comprises:
   a selection information recording unit for recording selection information representing as to whether said plurality of monitored equipment units are in a state that they are selected; and
   a recording unit responsive to reception of the ID information by said ID information receiving means for causing said selection information recording unit to record selection information representative of a matter that monitored equipment units identified by the received ID information are selected.

5. A network system according to claim 4, wherein in the event that said ID information receiving means receives a plurality of pieces of ID information, said recording unit causes said selection information recording unit to record selection information representative of a matter that a plurality of monitored equipment units identified by the received plurality of pieces of ID information, are selected.

6. A monitoring equipment connected to a plurality of monitored equipment units through a network, wherein said monitoring equipment comprises ID information receiving means for receiving ID information identifying monitored equipment units, a display screen, and symbol list display means for displaying on said display screen a list of symbols each corresponding to an associated one of said plurality of monitored equipment units connected to the network, and
   in the event that said ID information receiving means receives the ID information, said symbol list display means displays a symbol associated with a monitored equipment unit identified by the received ID information, in the list of symbols displayed on said display screen, in a display format different from a display format for other symbols.

7. A monitoring equipment according to claim 6, wherein in the event that said ID information receiving means receives a plurality of pieces of ID information, said symbol list display means displays a plurality of symbols associated with a plurality of monitored equipment units identified by the plurality of pieces of ID information received in a display format different from a display format for symbols other than said plurality of symbols.

8. A monitoring equipment according to claim 6, wherein said monitoring equipment comprises:
   a selection information recording unit for recording selection information representing as to whether said plurality of monitored equipment units are in a state that they are selected; and
   a recording unit responsive to reception of the ID information by said ID information receiving means for causing said selection information recording unit to record selection information representative of a matter that monitored equipment units identified by the received ID information are selected.

9. A monitoring equipment according to claim 8, wherein in the event that said ID information receiving means receives a plurality of pieces of ID information, said recording unit causes said selection information recording unit to record selection information representative of a matter that a plurality of monitored equipment units identified by the received plurality of pieces of ID information are selected.

10. An adapter for mediating a communication through a network to which a monitoring equipment having a display, is connected, said adapter being disposed between the network and a monitored equipment unit in association with the monitored equipment unit, wherein said adapter comprises:
    a switch; and
    ID information sending means for sending to said monitoring equipment, ID information to identify the monitored equipment unit associated with the adapter through an operation of said switch, the ID information corresponding to one of a plurality of symbols to be displayed on the display, each of the plurality of symbols drawing a different display format.

11. A network system in which a monitoring equipment and a plurality of monitored equipment units are interconnected through a network, wherein
    said monitoring equipment comprises a display screen, symbol list display means for displaying on said display screen a list of symbols each corresponding to an associated one of said plurality of monitored equipment units, a handler for designating a desired symbol from among the list of symbols displayed on said display screen, and designation information sending means for sending to a monitored equipment unit associated with a symbol designated in accordance with an operation of said handler designation information indicating that the monitored equipment unit is designated, and
    each of said plurality of monitored equipment units comprises designation information receiving means for receiving designation information indicating that oneself is designated, and response means responsive to the designation information by said designation information receiving means for making a performance indicating that oneself is a monitored equipment unit designated by the designation information.

12. A network system according to claim 11 wherein an adapter for mediating a communication through the network is provided for a monitored equipment unit in association with part or whole of said plurality of monitored equipment units, and as to the monitored equipment unit having the adapter of said plurality of monitored equipment units, instead of that the monitored equipment unit having the adapter is provided with said designation information receiving means and said response means, the adapter comprises designation information receiving means for receiving designation information indicating that a monitored equipment unit on which oneself is disposed is designated, and response means responsive to the designation information by said designation information receiving means for making a performance indicating that oneself is an adapter disposed on a monitored equipment unit designated by the designation information.

13. A monitored equipment unit coupled to a monitoring equipment having a display, through a network, comprising:

designation information receiving means for receiving designation information indicating that said monitored equipment unit is designated, and response means responsive to the received designation information, for making a performance indicating that said monitored equipment unit is designated by the received designation information, the designation information corresponding to one of a plurality of symbols to be displayed on the display, each of the plurality of symbols having a different display format.

14. An adapter for mediating a communication through a network to which a monitoring equipment having a display, is connected, said adapter being disposed between the network and a monitored equipment unit in association with the monitored equipment unit, wherein said adapter comprises:

designation information receiving means for receiving designation information indicating that a monitored equipment unit with which said adapter is associated, is designated; and response means, responsive to the received designation information, for making a performance indicating that said adapter is associated with the monitored equipment unit designated by the received designation information, the designation information corresponding to one of a plurality of symbols to be displayed on the display, each of the plurality of symbols having a different display format.

15. A monitoring program storage medium storing a monitoring program incorporated into a computer having a display screen, said computer being connected to a plurality of monitored equipment units through a network, and said computer serving as a monitoring equipment for monitoring the plurality of monitored equipment units in accordance with said monitoring program, wherein said monitoring program comprises:

ID information receiving means for receiving ID information transmitted via the network to identify the monitored equipment units; and symbol list display means for displaying on said display screen a list of symbols each corresponding to an associated one of said plurality of monitored equipment units connected to the network, and wherein said monitoring program provides such a control that in the event that said ID information receiving means receives the ID information, said symbol list display means displays a symbol associated with a monitored equipment unit identified by the received ID information, in the list of symbols displayed on said display screen, in a display format different from a display format for other symbols.

16. A method of identifying one of a plurality of monitored equipment units interconnected through a network, comprising:

sending from at least one of the plurality of monitored equipment units identification information which identifies the at least one of the plurality of monitored equipment units;

receiving the identification information and displaying one of a plurality of symbols which corresponds to the identification information, the plurality of symbols respectively corresponding to the plurality of monitored equipment units, and each of the plurality of symbols being displayed in a display format which is different from the display format of the other symbols.

* * * * *